US012760582B2

(12) United States Patent
Jeon

(10) Patent No.: US 12,760,582 B2
(45) Date of Patent: Oct. 13, 2026

(54) CABLE PULLEY ASSEMBLY

(71) Applicant: PHA CO., LTD., Daegu (KR)

(72) Inventor: Chan Joo Jeon, Suwon-si (KR)

(73) Assignee: PHA CO., LTD., Daegu (KR)

( * ) Notice: Subject to any disclaimer, the term of this patent is extended or adjusted under 35 U.S.C. 154(b) by 168 days.

(21) Appl. No.: 18/641,430

(22) Filed: Apr. 22, 2024

(65) Prior Publication Data

US 2024/0360718 A1 Oct. 31, 2024

(30) Foreign Application Priority Data

Apr. 26, 2023 (KR) ........................ 10-2023-0054927

(51) Int. Cl.
*E05F 15/00* (2015.01)
*E05F 15/689* (2015.01)
*B60J 5/04* (2006.01)

(52) U.S. Cl.
CPC ......... *E05F 15/6914* (2024.01); *B60J 5/0412* (2013.01); *E05Y 2900/55* (2013.01)

(58) Field of Classification Search
CPC ............. E05F 15/0914; E05Y 2900/55; E05Y 2201/668; E05Y 2201/654; E05Y 2600/626; E05Y 2600/51; F16H 55/50
See application file for complete search history.

(56) References Cited

U.S. PATENT DOCUMENTS 2,992,039 A * 7/1961 Bretzner .................... B60J 1/17 49/34
2003/0097798 A1* 5/2003 Staser .................... B60J 5/0416 49/502
2009/0019776 A1* 1/2009 Ohtaki .................... E05D 13/00 49/213
2010/0180508 A1* 7/2010 Yamaguchi ................ B60J 5/06 49/358
2014/0179475 A1* 6/2014 Fukumoto ............. E05F 11/483 474/166
2019/0128039 A1* 5/2019 Prabhakar ............. E05F 11/483
2020/0291711 A1* 9/2020 McCorkell ............ E05F 11/382

FOREIGN PATENT DOCUMENTS

CN 104428478 A * 3/2015 ............ E05F 11/483
CN 107435481 A * 12/2017 ............ E05F 11/485
DE 102006016456 A1 * 11/2007 ............ B60J 5/0468
DE 102019123013 A1 * 3/2020 ............ E05F 15/689
EP 0982165 A1 * 3/2000 ............ E05F 11/488
EP 2907954 B1 * 2/2019 ......... E05D 15/1042
JP 2016-008397 A 1/2016
KR 10-2004-0006604 A 1/2004
KR 10-0864508 B1 10/2008
KR 10-2011-0055485 A 5/2011

OTHER PUBLICATIONS

Office Action issued on Oct. 28, 2024 in Korean Patent Application No. 10-2023-0054927.

* cited by examiner

*Primary Examiner* — Emmanuel M Marcelo
(74) *Attorney, Agent, or Firm* — AJU IP Global PLLC

(57) ABSTRACT

A cable pulley assembly is disclosed, and the cable pulley assembly includes a pulley shaft of which a first side is fixedly inserted into a panel and a second side protrudes outward from the panel; a cable pulley configured to support a cable so that a traveling direction of the cable is bent and coupled to the second side of the pulley shaft to be rotatable relative to the pulley shaft about an axis of the pulley shaft; and a pulley bracket fixed to the panel and in contact with the pulley shaft.

9 Claims, 5 Drawing Sheets

CABLE PULLEY ASSEMBLY

CROSS-REFERENCE TO RELATED APPLICATION

This application claims the benefit under 35 U.S.C. § 119(a) of priority to Korean Patent Application No. 10-2023-0054927, filed on Apr. 26, 2023 in the Korean Intellectual Property Office, the entire disclosure of which is incorporated herein by reference for all purposes.

BACKGROUND

1. Field

The present invention relates to a cable pulley assembly including a cable pulley that contact-supports a cable to maintain tension in the cable.

2. Discussion of Related Art

Generally, windows for ventilation are provided in left and right doors of vehicle passenger compartments, and the windows are equipped with door glass that is raised and lowered by the power of an electric motor to open and close the windows. The door glass is raised and lowered after coupling to a cable that moves in one direction and a direction opposite to the one direction according to the direction of rotation of a motor shaft of the electric motor.

A cable pulley is installed on the door panel to contact-support the cable in such a way that a traveling direction of the cable is bent. However, a large load is applied to the cable pulley due to the tension of the cable. When window opening and closing operations are repeated, the load applied to the cable pulley is transferred to the pulley shaft supporting the cable pulley and the door panel to which the pulley shaft is fixed.

This can cause noise between the cable pulley and the pulley shaft or between the pulley shaft and the door panel. In severe cases, areas where stress is concentrated on the pulley shaft and door panel can be damaged or broken.

The background technology of the present invention is disclosed in Korean Patent Publication No. 10-0864508 (Title of Invention: DOOR MODULE OF VEHICLE, registered on Oct. 14, 2008).

SUMMARY OF THE INVENTION

The present invention is directed to providing a cable pulley assembly that does not cause noise and is not damaged despite the tension of a cable.

According to an aspect of the present invention, there is provided a cable pulley assembly including: a pulley shaft of which a first side is fixedly inserted into a panel and a second side protrudes outward from the panel; a cable pulley configured to support a cable so that a traveling direction of the cable is bent and coupled to the second side of the pulley shaft to be rotatable relative to the pulley shaft about an axis of the pulley shaft; and a pulley bracket fixed to the panel and in contact with the pulley shaft.

The first side of the pulley shaft may include a screw portion having a male thread pattern formed on an outer circumferential surface of the pulley shaft.

The pulley bracket may include a shaft guide portion formed with a shaft through hole through which the pulley shaft passes, extending along the axis, and whose inner circumferential surface defining the shaft through hole is in contact with an outer circumferential surface of the pulley shaft.

The pulley bracket may further include a bracket flange portion spaced apart from the shaft guide portion and extending to be inserted into the panel.

An inwardly formed bracket flange portion insertion groove may be formed in the panel so that the bracket flange portion is inserted thereinto, and the bracket flange portion may be in contact with an inner side surface of the bracket flange portion insertion groove.

The pulley bracket may further include a bracket body portion connecting the shaft guide portion and the bracket flange portion.

The cable pulley may include a friction reducing protrusion protruding toward the bracket body portion to reduce an area in contact with the bracket body when rotating about the pulley shaft.

A distance between the axis of the pulley shaft and the bracket flange portion may be greater than or equal to a radius of the cable pulley.

The bracket flange portion may be positioned to oppose a direction of force applied to the pulley shaft by tension of the cable.

The pulley bracket may be formed by performing press processing on a metal sheet material.

BRIEF DESCRIPTION OF THE DRAWINGS

The above and other objects, features and advantages of the present invention will become more apparent to those of ordinary skill in the art by describing exemplary embodiments thereof in detail with reference to the accompanying drawings, in which.

DETAILED DESCRIPTION

Hereinafter, a cable pulley assembly according to the embodiments of the present invention will be described in detail with reference to the attached drawings. The terminology used herein refers to terms used to appropriately express preferred embodiments of the present invention and may vary depending on the intention of the user or operator or the conventions of the field to which the present invention belongs. Accordingly, definitions of these terms should be made based on the content throughout this specification.

Figure 1:
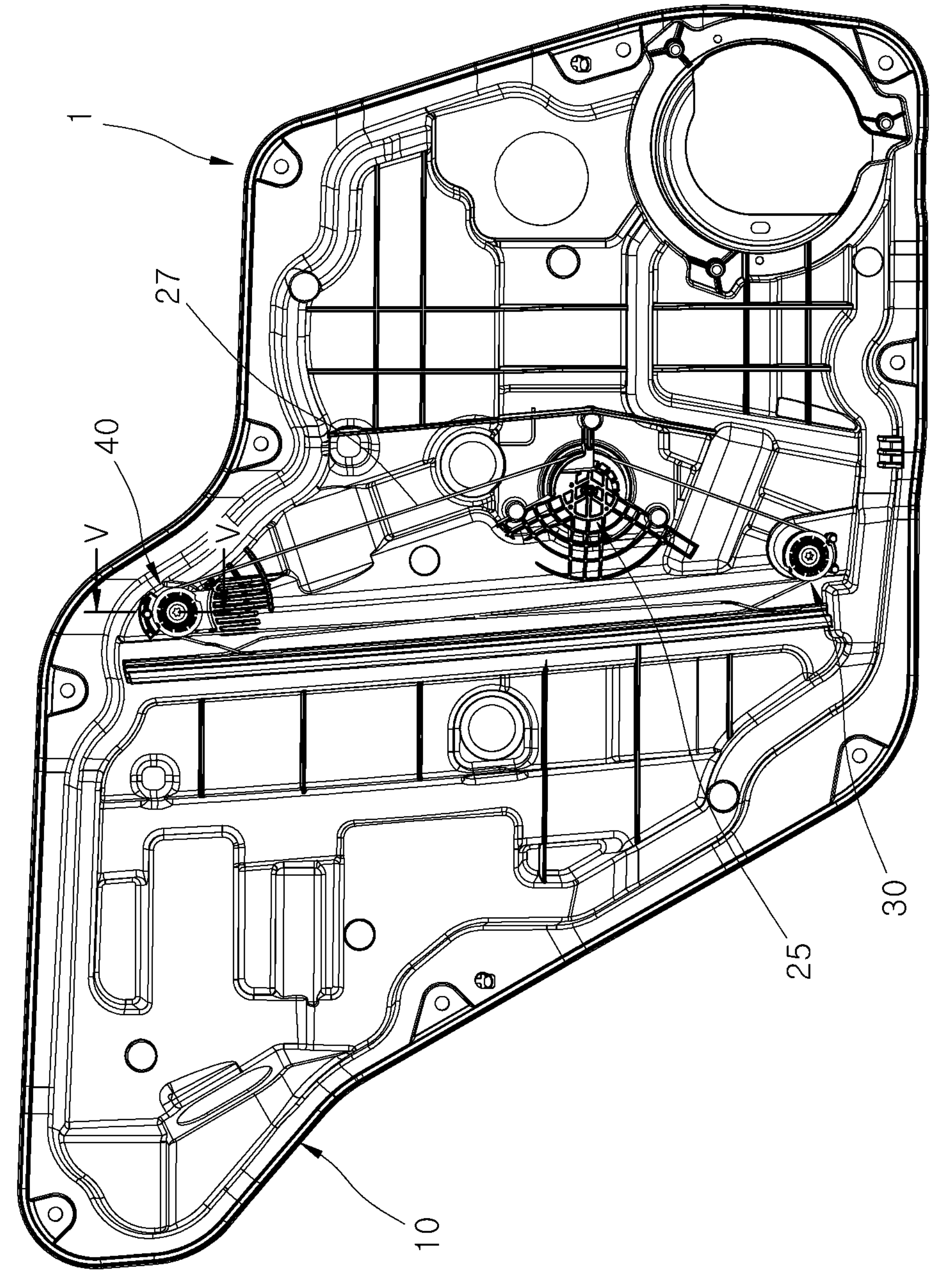
FIG. 1 is a perspective view of a door module including a cable pulley assembly according to one embodiment of the present invention.
Figure 2:
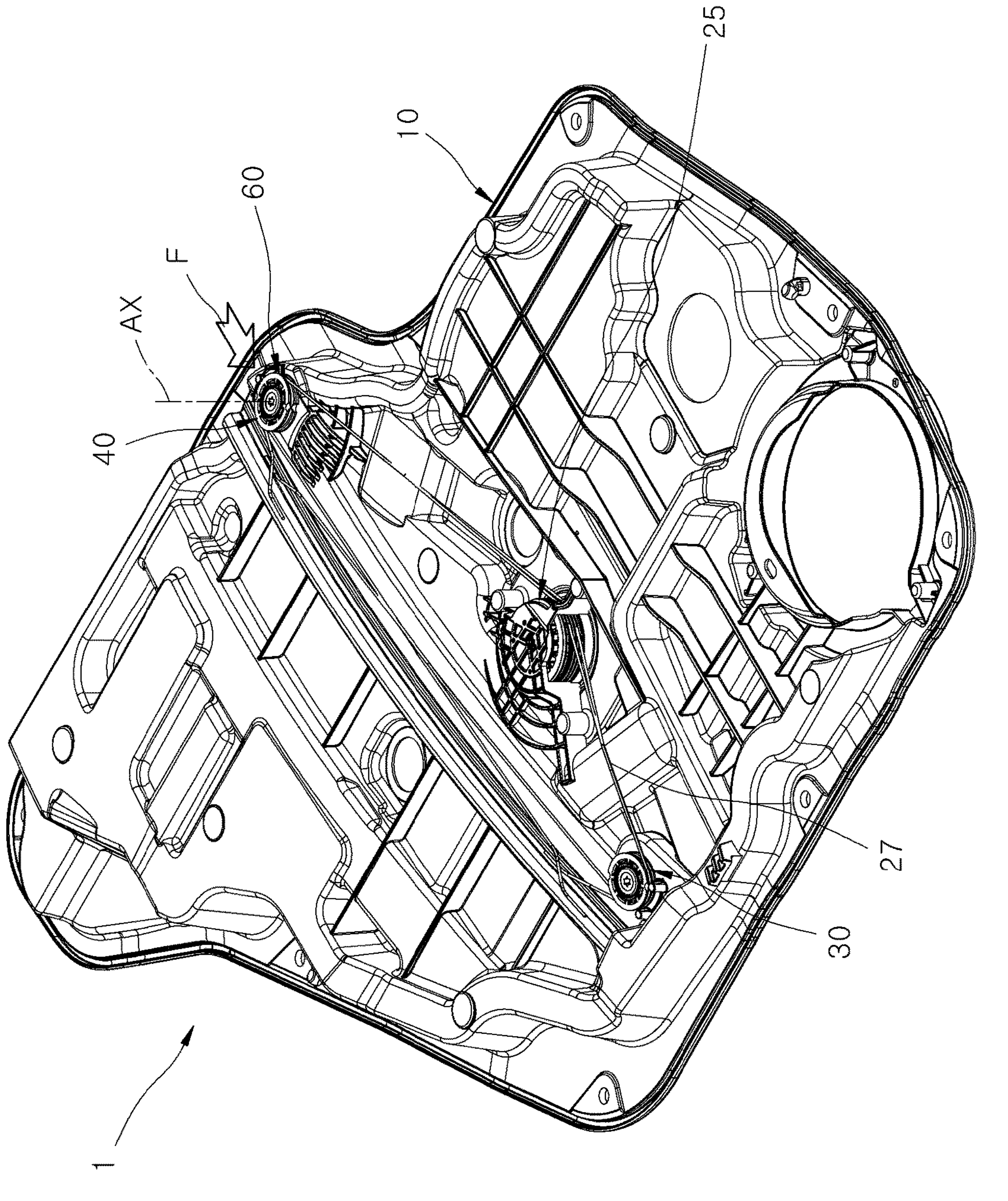
FIG. 2 is a front view of the door module of FIG. 1.
Figure 3:
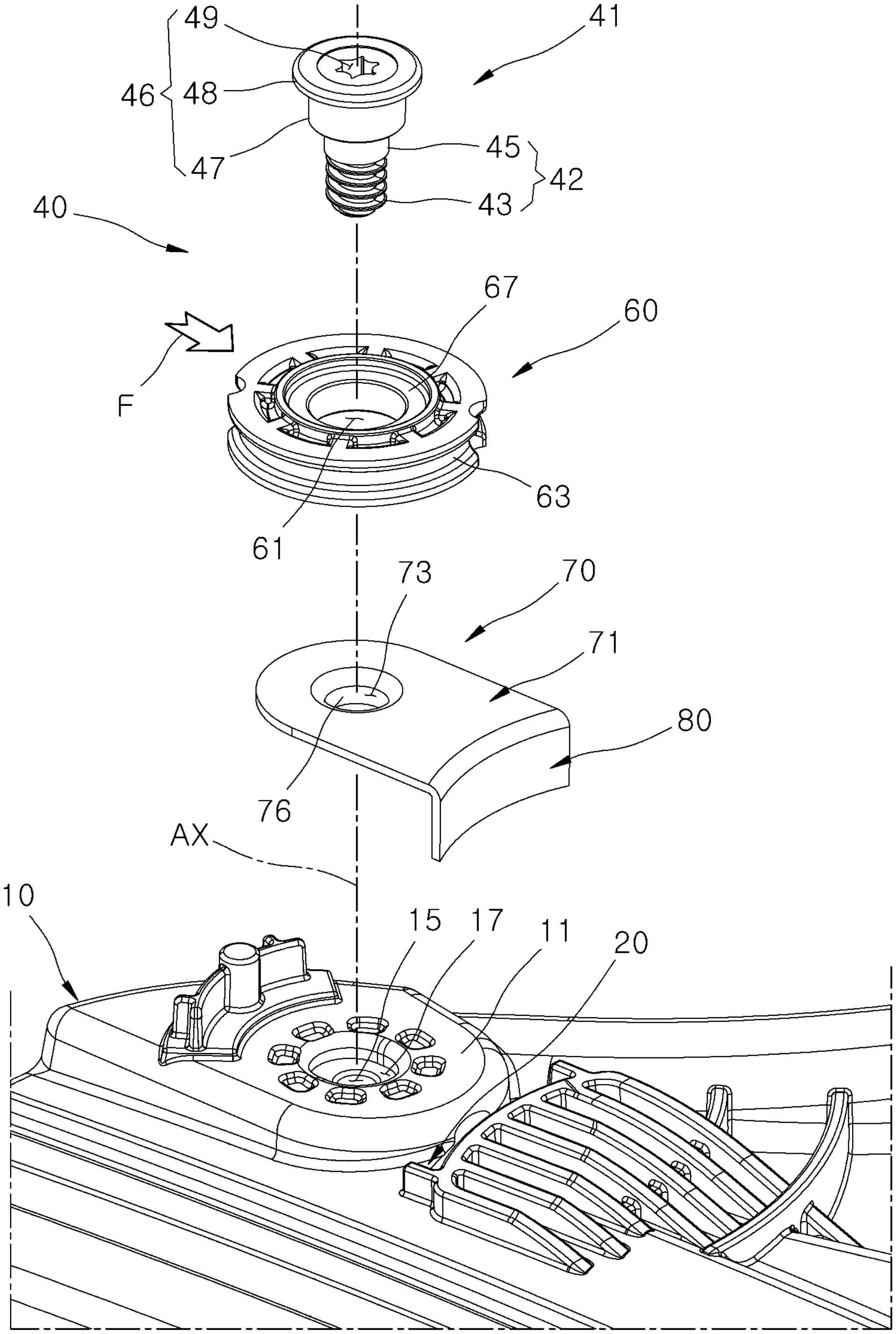
FIG. 3 is an exploded perspective view of the cable pulley assembly of FIG. 1.
Figure 4:
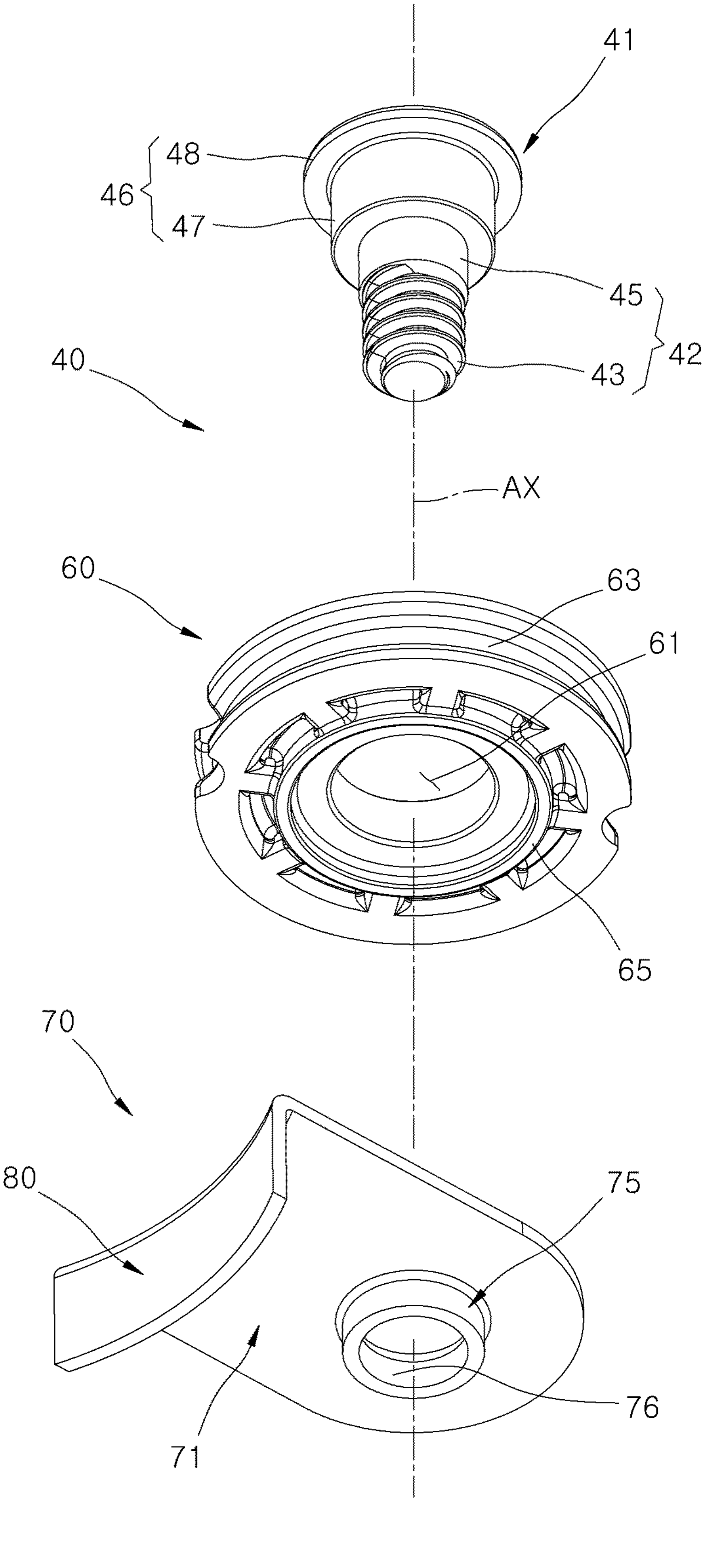
FIG. 4 is an exploded perspective view showing a pulley shaft, a cable pulley, and a pulley bracket of FIG. 3, as viewed from below.
Figure 5:
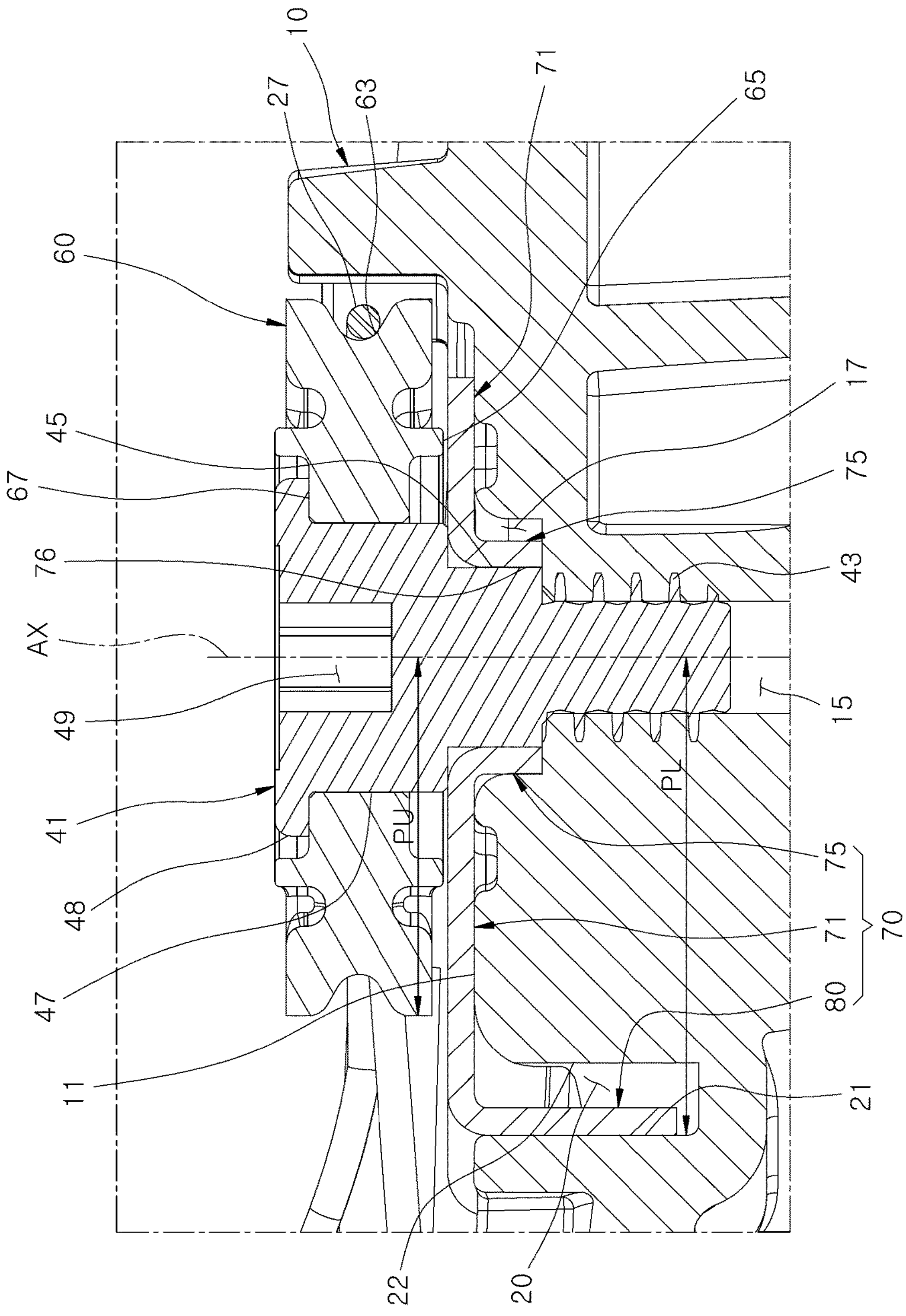
FIG. 5 is a cross-sectional view along a line V-V of FIG. 1.

FIG. 1 is a perspective view of a door module including a cable pulley assembly according to one embodiment of the present invention, FIG. 2 is a front view of the door module of FIG. 1, FIG. 3 is an exploded perspective view of the cable pulley assembly of FIG. 1, FIG. 4 is an exploded perspective view showing a pulley shaft, a cable pulley, and a pulley bracket of FIG. 3, as viewed from below, and FIG. 5 is a cross-sectional view along a line V-V of FIG. 1.

Referring to FIGS. 1 to 5, a cable pulley assembly according to one embodiment of the present invention may be included in, for example, a door module 1 installed on left and right doors of a vehicle passenger compartment. The door module 1 may include a panel 10, an electric motor (not shown), a drum 25, a lower cable pulley assembly 30, and an upper cable pulley assembly 40.

The drum 25 is rotatably supported on one side surface 11 of the panel 10. A cable 27 is wound around an outer circumferential surface of the drum 25. The electric motor (not shown) provides power to rotate the drum 25 and is fixedly supported on the other side of the panel 10. The lower cable pulley assembly 30 is installed below the drum 25 at a lower end of the panel 10, and the upper cable pulley assembly 40 is installed above the drum 25 at an upper end of the panel 10.

The cable 27 unwound and drawn from the drum 25 may be wound around the drum 25, the lower cable pulley assembly 30, and the upper cable pulley assembly 40 by passing over the lower cable pulley assembly 30 and the upper cable pulley assembly 40 and moving toward the drum 25.

A portion of the cable 27, specifically a portion between the lower cable pulley assembly 30 and the upper cable pulley assembly 40, is fixedly coupled to a glass holder that grips and supports a lower end of the door glass (not shown).

With this configuration, when a motor shaft of the electric motor rotates in one direction, the cable 27 may move upward between the lower cable pulley assembly 30 and the upper cable pulley assembly 40 to raise the door glass, and windows formed in the left and right doors may be closed.

Meanwhile, when the motor shaft of the electric motor rotates in a direction opposite to the one direction, the cable 27 may move downward between the lower cable pulley assembly 30 and the upper cable pulley assembly 40 to lower the door glass, and the windows formed in the left and right doors may be opened.

The upper cable pulley assembly 40 includes a pulley shaft 41, a cable pulley 60, and a pulley bracket 70. A first side 42 of the pulley shaft 41 is fixedly inserted into the panel 10, and a second side 46 of the pulley shaft 41 protrudes outward from the panel 10. The pulley shaft 41 extends along an axis AX perpendicular to the one side surface 11 of the panel 10, and the first side 42 and the second side 46 may be integrally connected.

Specifically, the first side 42 of the pulley shaft 41 may include a screw portion 43 and a bracket coupling portion 45. A male thread pattern is formed on an outer circumferential surface of the screw portion 43. The bracket coupling portion 45 is a cylindrical portion having a diameter larger than a diameter of the screw portion 43 and may be connected in a stepped manner to one side end of the screw portion 43 that is an upper end based on FIGS. 3 and 4.

The second side 46 of the pulley shaft 41 may include a pulley coupling portion 47 and a shaft flange portion 48. The pulley coupling portion 47 is a cylindrical portion having a diameter larger than the diameter of the bracket coupling portion 45 and may be connected in a stepped manner to one side end of the bracket coupling portion 45 that is an upper end based on FIGS. 3 and 4. The shaft flange portion 48 is a portion having a diameter that extends in a stepped manner from one side end of the pulley coupling portion 47 that is an upper end based on FIGS. 3 and 4.

A tool fitting groove 49, such as a hexagonal wrench groove, may be formed in the second side 46 of the pulley shaft 41. A tool such as a hexagonal wrench is inserted into the tool fitting groove 49 and the pulley shaft 41 is rotated in one direction about the axis AX to fixedly insert the screw portion 43 into the one side surface 11 of the panel 10.

The screw portion 43, the bracket coupling portion 45, and the pulley coupling portion 47 may be connected in series along the axis AX. The pulley shaft 41 may be made of a metal material such as stainless steel.

A screw portion fastening hole 15 extending in the direction of the axis AX is formed in the one side surface 11 of the panel 10 so that the screw portion 43 may be fixedly inserted into the screw portion fastening hole 15. A female thread pattern corresponding to the male thread pattern of the screw portion 43 may be formed in an inner circumferential surface of the screw portion fastening hole 15. However, even when the female thread pattern is not formed in the inner circumferential surface of the screw portion fastening hole 15 at the time of manufacturing the panel 10, the screw portion 43 is inserted into the screw portion fastening hole 15 and the inner circumferential surface of the screw portion fastening hole 15 is deformed to form a female thread pattern corresponding to the male thread pattern.

The cable pulley 60 supports the cable 27 so that a traveling direction of the cable 27 is bent. In other words, a one side portion of the cable 27 extending from the cable pulley 60 toward the lower cable pulley assembly 30 and the other side portion of the cable 27 extending from the cable pulley 60 toward the drum 25 form an angle less than 180°.

The cable pulley 60 is coupled to the second side 46 of the pulley shaft 41, specifically the pulley coupling portion 47, to be rotatable about the pulley shaft 41 about the axis AX. The cable pulley 60 has a hollow 61 through which the pulley shaft 41 passes formed in the center thereof.

An inwardly formed annular shaft flange portion seating surface 67 is formed at a peripheral portion of the hollow 61 on the upper side surface of the cable pulley 60 based on FIGS. 3 and 4. When the pulley shaft 41 passes through the hollow 61 of the cable pulley 60 and is fixed to the panel 10, an outer circumferential surface of the pulley coupling portion 47 faces an inner circumferential surface of the hollow 61, and the shaft flange portion 48 faces the shaft flange portion seating surface 67.

Therefore, when the cable pulley 60 rotates about the axis AX, vibrations and noise caused by the vibrations are suppressed, and the cable pulley 60 may not be separated from the pulley shaft 41.

An inwardly formed annular cable fitting groove 63 may be formed in an outer circumferential surface of the cable pulley 60 so that the cable 27 is not separated from the cable pulley 60 when traveling through the cable pulley 60. The cable pulley 60 may be made of, for example, a synthetic resin material such as engineering plastic.

The pulley bracket 70 is fixed to the panel 10 and in close contact with the pulley shaft 41. The pulley bracket 70 may include a bracket body portion 71, a shaft guide portion 75, and a bracket flange portion 80. The bracket body portion 71 connects the shaft guide portion 75 and the bracket flange portion 80. The bracket body portion 71 covers the one side surface 11 of the panel 10 while assembled to the panel 10 and may be in close contact with the one side surface 11.

Meanwhile, the cable pulley 60 may include a friction reducing protrusion 65 protruding in an annular shape on the opposite side of the shaft flange portion seating surface 67. When the cable pulley 60 rotates about the axis AX due to friction with the cable 27, the cable pulley 60 may rotate while only the friction reducing protrusion 65 is in contact with the bracket body portion 71.

To elaborate, since the cable pulley 60 rotates while being contact-supported by the bracket body portion 71, it may rotate stably without shaking, and it may rotate more smoothly because an area in contact with the bracket body portion 71 is reduced and frictional resistance is reduced.

The shaft guide portion 75 is a tubular portion formed with a shaft through hole 73 through which the pulley shaft 41 passes and extending along the axis AX. When the pulley shaft 41 passes through the shaft through hole 73, whose inner circumferential surface 76 defining the shaft through hole 73 may be in close contact with an outer circumferential surface of the pulley shaft 41, specifically, an outer circumferential surface of the bracket coupling portion 45.

A guide portion insertion groove 17 connected to the screw portion fastening hole 15 is formed in the one side surface 11 of the panel 10. The shaft guide portion 75 may be fitted into the guide portion insertion groove 17. Since the screw portion 43 of the pulley shaft 41 is fixedly inserted into the screw portion fastening hole 15 and the bracket coupling portion 45 is in close contact with the shaft guide portion 75, the pulley shaft 41 may be firmly fixed to the panel 10 and may not shake even when a force F is applied by the tension of the cable 27.

The bracket flange portion 80 may be spaced apart from the shaft guide portion 75 and may extend to be inserted into the panel 10. An inwardly formed bracket flange portion insertion groove 20 may be formed in the one side surface 11 of the panel 10 so that the bracket flange portion 80 is inserted thereinto.

A width of the bracket flange portion insertion groove 20 is limited by a first inner surface 21 and a second inner surface 22 spaced apart to face each other, and the bracket flange portion 80 may be in close contact with the first inner surface 21. Thus, a force F applied to the pulley shaft 41 by the tension of the cable 27 via the cable pulley 60 is distributed without being supported only by the screw portion 43 and a peripheral portion of the screw portion fastening hole 15 in close contact with the screw portion 43.

In other words, the force F applied to the pulley shaft 41 by the tension of the cable 27 is distributed to the peripheral portion of the screw portion 43 and the screw portion fastening hole 15, the bracket coupling portion 45 and the shaft guide portion 75, and the peripheral portion of the bracket flange portion 80 and the bracket flange portion insertion groove 20 so that stress is not concentrated.

Accordingly, the occurrence of noise between the cable pulley 60 and the pulley shaft 41 or between the pulley shaft 41 and the panel 10 is suppressed, and damage to the pulley shaft 41 and the panel 10 is prevented. FIG. 5 illustrates the bracket flange portion 80 in close contact with the first inner surface 21, but alternatively, the bracket flange portion 80 may be in close contact with the second inner surface 22 or may be in close contact with both the first inner surface 21 and the second inner surface 22.

The pulley bracket 70 may be formed, for example, by performing press processing on a metal sheet material made of metal such as stainless steel. To prevent the pulley bracket 70 from being separated from the panel 10 or deformed by the force transmitted from the pulley shaft 41, the bracket flange portion 80 may be positioned to face the direction of the force F applied to the pulley shaft 41 by the tension of the cable 27.

For example, as indicated by an arrow in FIG. 2, the direction of the force F applied to the pulley shaft 41 may be a direction intersecting the axis AX and toward the lower cable pulley assembly 30. The bracket flange portion 80 may be located at a point slightly spaced apart from the axis AX toward the lower cable pulley assembly 30 on an imaginary straight line intersecting the axis AX and toward the lower cable pulley assembly 30 to face the direction of the force F.

A distance PL between the axis AX of the pulley shaft 41 and the bracket flange portion 80 may be greater than or equal to the radius PU of the cable pulley 60. As the distance PL between the axis AX and the bracket flange portion 80 increases, the stress may be distributed to a portion of the panel 10 spaced apart from the axis AX through the bracket flange portion 80. However, as the distance between the axis AX and the bracket flange portion 80 increases, the manufacturing costs of the pulley bracket 70 may increase and assembly may be inconvenient.

The method of assembling the cable pulley assembly 40 is as follows. First, the pulley bracket 70 is installed on the one side surface 11 of the panel 10 so that the shaft guide portion 75 is fitted into the guide portion insertion groove 17 of the panel 10 and the bracket flange portion 80 is fitted into and brought into close contact with the bracket flange portion insertion groove 20. In this case, the bracket body portion 71 may be in close contact with the one side surface 11 of the panel 10.

Next, the cable pulley 60 is placed on the bracket body portion 71 so that the hollow 61 of the cable pulley 60 is aligned on the axis AX. Next, the pulley shaft 41 is rotated and fixed to the one side surface 11 of the panel 10 so that the screw portion 43 is inserted and fastened to the screw portion fastening hole 15

When the pulley shaft 41 is inserted into the panel 10 until the stepped surface between the bracket coupling portion 45 and the screw portion 43 touches the bottom surface of the guide portion insertion groove 17, the bracket coupling portion 45 is in close contact with the shaft guide portion 75, and the stepped surface between the pulley coupling portion 47 and the bracket coupling portion 45 closely presses the peripheral portion of the shaft guide portion 75 so that the shaft guide portion 75 may be firmly and closely fixed to the bottom surface of the guide portion insertion groove 17.

The cable pulley assembly 40 described above includes a pulley bracket 70 that is firmly and closely fixed to the pulley shaft 41 and the panel 10 so that stress is not concentrated on the pulley shaft 41 or the panel 10, and the stress is distributed to portions of the panel 10 spaced apart from the axis AX of the pulley shaft 41.

Accordingly, the occurrence of noise between the cable pulley 60 and the pulley shaft 41 or between the pulley shaft 41 and the panel 10 is suppressed, and the pulley shaft 41 and the panel 10 are not damaged. In addition, the cable pulley assembly 40 has a simple structure and is easy to assemble, thereby reducing the cost of manufacturing and assembly work.

A cable pulley assembly of the present invention includes a pulley shaft and a pulley bracket that is firmly and closely fixed to a panel so that stress is not concentrated on the pulley shaft or the panel, but is distributed to portions of the panel spaced far from the axis of the pulley shaft.

Accordingly, the occurrence of noise between a cable pulley and the pulley shaft or between the pulley shaft and the panel is suppressed, and the pulley shaft and the panel are not damaged.

Furthermore, the cable pulley assembly of the present invention has a simple structure and is easy to assemble, thereby reducing the cost of manufacturing and assembly work.

The present invention has been described with reference to embodiments shown in the drawings, but this is merely illustrative, and those skilled in the art will understand that various modifications and other equivalents are possible therefrom. Therefore, the true scope of protection of the present invention should be determined only by the appended claims.

What is claimed is:

1. A cable pulley assembly comprising:

a pulley shaft of which a first side is fixedly inserted into a panel and a second side protrudes outward from the panel;

a cable pulley configured to support a cable so that a traveling direction of the cable is bent and coupled to the second side of the pulley shaft to be rotatable relative to the pulley shaft about an axis of the pulley shaft; and a pulley bracket fixed to the panel and in contact with the pulley shaft, wherein the first side of the pulley shaft includes a screw portion having a male thread pattern formed on an outer circumferential surface of the pulley shaft.

2. The cable pulley assembly of claim 1, wherein the pulley bracket includes a shaft guide portion formed with a shaft through hole through which the pulley shaft passes, extending along the axis, and whose inner circumferential surface defining the shaft through hole is in contact with the outer circumferential surface of the pulley shaft.

3. The cable pulley assembly of claim 2, wherein the pulley bracket further includes a bracket flange portion spaced apart from the shaft guide portion and extending to be inserted into the panel.

4. The cable pulley assembly according to claim 3, wherein an inwardly formed bracket flange portion insertion groove is formed in the panel so that the bracket flange portion is inserted thereinto, and the bracket flange portion is in close contact with an inner side surface of the bracket flange portion insertion groove.

5. The cable pulley assembly of claim 3, wherein the pulley bracket further includes a bracket body portion connecting the shaft guide portion and the bracket flange portion.

6. The cable pulley assembly of claim 5, wherein the cable pulley includes a friction reducing protrusion protruding toward the bracket body portion to reduce an area in contact with the bracket body when rotating about the pulley shaft.

7. The cable pulley assembly of claim 3, wherein a distance between the axis of the pulley shaft and the bracket flange portion is greater than or equal to a radius of the cable pulley.

8. The cable pulley assembly of claim 3, wherein the bracket flange portion is positioned to oppose a direction of force applied to the pulley shaft by tension of the cable.

9. The cable pulley assembly of claim 1, wherein the pulley bracket is formed by performing press processing on a metal sheet material.

* * * * *